(12) United States Patent
Oda et al.

(10) Patent No.: US 12,442,636 B2
(45) Date of Patent: Oct. 14, 2025

(54) SEA CONDITION INFORMATION PROVIDING DEVICE, SEA CONDITION INFORMATION PROVIDING SYSTEM, SEA CONDITION INFORMATION PROVIDING PROGRAM, AND SEA CONDITION INFORMATION PROVIDING METHOD

(71) Applicants: Meta Systems Laboratories, Inc., Kagoshima (JP); Ocean Solution Technology Kabushiki Kaisha, Nagasaki (JP)

(72) Inventors: Kentaro Oda, Kagoshima (JP); Yosuke Mizukami, Nagasaki (JP)

(73) Assignees: Meta Systems Laboratories, Inc., Kagoshima (JP); Ocean Solution Technology Kabushiki Kaisha, Nagasaki (JP)

( * ) Notice: Subject to any disclaimer, the term of this patent is extended or adjusted under 35 U.S.C. 154(b) by 0 days.

(21) Appl. No.: 18/880,238

(22) PCT Filed: Jun. 14, 2023

(86) PCT No.: PCT/JP2023/022033
§ 371 (c)(1),
(2) Date: Dec. 30, 2024

(87) PCT Pub. No.: WO2024/004649
PCT Pub. Date: Jan. 4, 2024

(65) Prior Publication Data
US 2025/0257994 A1   Aug. 14, 2025

(30) Foreign Application Priority Data
Jun. 30, 2022   (JP) ................. 2022-106410

(51) Int. Cl.
*G01C 13/00* (2006.01)

(52) U.S. Cl.
CPC ......... *G01C 13/002* (2013.01); *G01C 13/008* (2013.01)

(58) Field of Classification Search
CPC .... G01C 13/006; G01C 13/004; G01C 13/00; G01C 13/002; G01C 13/008; G01C 5/06;
(Continued)

(56) References Cited

U.S. PATENT DOCUMENTS 5,363,307 A * 11/1994 Yoshida .................. G01S 15/88
                                                       701/493
11,852,477 B2 * 12/2023 Wiesman ............. G01C 13/004

FOREIGN PATENT DOCUMENTS

CN    115204073 A * 10/2022    ........... G01C 13/004
JP    S5744589 A    3/1982
(Continued)

OTHER PUBLICATIONS

International Search Report and Written Opinion, mailed Aug. 22, 2023, for International Application Serial No. PCT/JP2023/022033 filed on Jun. 14, 2023.

*Primary Examiner* — Andre J Allen
(74) *Attorney, Agent, or Firm* — K&L Gates LLP; Brian Novak; Giorgios N. Kefallinos

(57) ABSTRACT

A first layer tidal current data acquirer acquires first layer tidal current data that represent a first layer vector quantity representing a direction and a speed of a tidal current in a first layer. A second layer tidal current data acquirer acquires second layer tidal current data that represent a second layer vector quantity representing a direction and a speed of a tidal current in a second layer. An inter-layer tidal current difference calculator calculates inter-layer tidal current difference data that represent an in-plane distribution of a difference vector quantity being a difference between the first layer vector quantity and the second layer vector quantity. A display controller performs inter-layer tidal current differ- (Continued)

ence display control for displaying, over a map, an inter-layer tidal current difference distribution map that visualizes the in-plane distribution of the difference vector quantity represented by the inter-layer tidal current difference data.

8 Claims, 9 Drawing Sheets

(58) Field of Classification Search
CPC .......... G01C 17/34; G01C 25/00; G01C 5/04;
G01C 9/00; G01C 9/06; G01C 9/14;
G01C 9/18; G01C 21/16; G01C 21/185;
G01C 21/203; G01C 9/12
USPC .......................................... 73/170.29–170.34
See application file for complete search history.

(56) References Cited

FOREIGN PATENT DOCUMENTS

| | | | | |
|---|---|---|---|---|
| JP | S60225020 A | * | 11/1985 | ........... G01C 13/006 |
| JP | H0140055 Y2 | | 12/1989 | |
| JP | H07248727 A | | 9/1995 | |
| JP | 2000009488 A | | 1/2000 | |
| JP | 7359803 B2 | * | 10/2023 | ........... G01C 21/203 |
| JP | 7431194 B2 | * | 2/2024 | ........... G01C 21/203 |
| WO | 2024/004649 A1 | | 1/2024 | |
| WO | WO-2024183160 A1 | * | 9/2024 | ............. G01S 19/14 |

* cited by examiner

FIG. 5

| LOCAL REGION (CANDIDATE FOR FISHING GROUND) | SEA CONDITION AT 9 AM | TODAY | TOMORROW | DAY AFTER TOMORROW | TWO DAYS AFTER TOMORROW | AFTER FOUR DAYS | AFTER FIVE DAYS |
|---|---|---|---|---|---|---|---|
| | | MOON PHASE 4 | MOON PHASE 5 | MOON PHASE 6 | MOON PHASE 7 [FIRST QUARTER] | MOON PHASE 8 | MOON PHASE 9 |
| OFF COAST OF TSUSHIMA | AI CATCH PREDICTION | | | | | | |
| 123 MILES FROM CURRENT LOCATION | SEA WATER TEMPERATURE | 14.4°C | 13.5°C | 13.6°C | 13.9°C | 13.2°C | 13.0°C |
| | SEA CURRENT | 0.19kn | 0.073kn | 0.020kn | 0.047kn | 0.14kn | 0.29kn |
| | TIDAL CURRENT DIFFERENCE | 0.14kn | 0.021kn | 0.03kn | 0.046kn | 0.038kn | 0.021kn |

SEA CONDITION INFORMATION PROVIDING DEVICE, SEA CONDITION INFORMATION PROVIDING SYSTEM, SEA CONDITION INFORMATION PROVIDING PROGRAM, AND SEA CONDITION INFORMATION PROVIDING METHOD

CROSS REFERENCE TO RELATED APPLICATION(S)

This application is a national phase filing of International Application Serial No. PCT/JP2023/022033, filed on Jun. 14, 2023, which claims the benefit of priority to Japanese Patent Application Serial No. 2022-106410, filed on Jun. 30, 2022, the entire disclosures each of which are incorporated herein by reference.

TECHNICAL FIELD

The present disclosure relates to a sea condition information providing device, a sea condition information providing system, a sea condition information providing program, and a sea condition information providing method.

BACKGROUND ART

When fishing is performed, tidal currents in a plurality of layers having different water depths in the sea may be checked. Note that, in the present specification, a "layer" indicates a horizontal layered virtual region having a thickness in the sea.

For example, fishing with a round haul net is performed after it is checked that there is no great change in a direction and a speed of tidal currents between layers having different water depths in a place where the net is to be laid. The reason is that there is a case where a direction or a speed of tidal currents between layers greatly varies, and, in such a case, it is difficult to appropriately lay a net in the sea.

As disclosed in Patent Literature 1, a tidal current measuring device installed in a ship is known as means for measuring tidal currents in a plurality of layers in the sea. The tidal current measuring device has functions of measuring a direction and a speed of tidal currents in a plurality of layers directly below a ship, and displaying the measured direction and the measured speed of the tidal currents by layer in a graph.

CITATION LIST

Patent Literature

Patent Literature 1: Unexamined Japanese Patent Application Publication No. S57-44859

SUMMARY OF INVENTION

Technical Problem

In the tidal current measuring device according to Patent Literature 1, only a local tidal current directly below a ship can be checked. Therefore, whether tidal currents resemble each other between layers in a place being a candidate for a fishing ground needs to be checked by a ship actually going to the place. Thus, it may take time to search for a fishing ground where tidal currents resemble each other between layers.

An objective of the present disclosure is to provide a technique being able to easily find a region where tidal currents resemble each other between layers having different water depths.

Solution to Problem

A sea condition information providing device according to the present disclosure includes:
 a first layer tidal current data acquirer to acquire first layer tidal current data that represent an in-plane distribution in a first layer of the sea of a first layer vector quantity representing a direction and a speed of a tidal current in the first layer;
 a second layer tidal current data acquirer to acquire second layer tidal current data that represent an in-plane distribution in a second layer of a second layer vector quantity representing a direction and a speed of a tidal current in the second layer having a deeper water depth than the first layer;
 an inter-layer tidal current difference calculator to calculate, by using the first layer tidal current data and the second layer tidal current data, inter-layer tidal current difference data that represent an in-plane distribution of a difference vector quantity being a difference between the first layer vector quantity and the second layer vector quantity, the in-plane distribution being parallel to the first layer and the second layer; and
 a display controller to perform inter-layer tidal current difference display control for displaying, over a map, an inter-layer tidal current difference distribution map that visualizes the in-plane distribution of the difference vector quantity represented by the inter-layer tidal current difference data.

The sea condition information providing device may further include
 a deep layer tidal current data acquirer to acquire deep layer tidal current data that represent an in-plane distribution in a deep layer of a deep layer vector quantity representing a direction and a speed of a tidal current in the deep layer closer to a sea bottom than the second layer,
 wherein the display controller may further perform deep layer tidal current display control for displaying, over the map expressing relief of the sea bottom, a deep layer tidal current distribution map that visualizes the in-plane distribution of the deep layer vector quantity represented by the deep layer tidal current data.

The first layer tidal current data acquired by the first layer tidal current data acquirer may include the in-plane distribution of the first layer vector quantity as a future predicted value,
 the second layer tidal current data acquired by the second layer tidal current data acquirer may include the in-plane distribution of the second layer vector quantity as a future predicted value,
 the sea condition information providing device may further include a local region designation acceptor to accept, from a user, designation of a local region in the sea on the map displayed by the display controller, and,
 when designation of the local region is accepted by the local region designation acceptor,
 (i) the inter-layer tidal current difference calculator may calculate, by using the first layer tidal current data and the second layer tidal current data, the inter-layer tidal current difference data about the local region for future n (note that n≥ is a natural number equal to or more than two) unit periods, and (ii) the display controller may perform local tidal current difference image display control for creating, by the unit period, a local tidal current difference image in which the inter-layer tidal current difference distribution map of the local region overlaps the map of the local region, by using the inter-layer tidal current difference data about the local region for future n unit periods, and displaying the created local tidal current difference image for future n unit periods.

The sea condition information providing device may further include a catch quantity predictor to predict, for each of the unit periods, a catch quantity in the local region for future n unit periods by using at least the first layer tidal current data and the second layer tidal current data, wherein the display controller may display, by the unit period, a prediction result of the catch quantity predictor together with the local tidal current difference image for future n unit periods in the local tidal current difference image display control.

The sea condition information providing device may further include a sea water temperature data acquirer to acquire sea water temperature data that represent an in-plane distribution of sea water temperature parallel to the first layer and the second layer, the sea water temperature data including the in-plane distribution of the sea water temperature as a future predicted value, wherein, in the local tidal current difference image display control, the display controller may create, for future n unit periods by the unit period, a local sea water temperature distribution image representing the in-plane distribution of the sea water temperature in the local region, and display, for future n unit periods by the unit period, the created local sea water temperature distribution image together with the local tidal current difference image.

In the local tidal current difference image display control, the display controller may create, for future n unit periods by the unit period, a local tidal current distribution image representing the in-plane distribution of the first layer vector quantity in the local region, and display, for future n unit periods by the unit period, the created local tidal current distribution image together with the local tidal current difference image.

A sea condition information providing system according to the present disclosure includes:

the above-described sea condition information providing device according to the present disclosure; and a data providing device to provide the first layer tidal current data to the first layer tidal current data acquirer of the sea condition information providing device, and also provide the second layer tidal current data to the second layer tidal current data acquirer of the sea condition information providing device.

A sea condition information providing program according to the present disclosure causes a computer to function as:

a first layer tidal current data acquirer to acquire first layer tidal current data that represent an in-plane distribution in a first layer of the sea of a first layer vector quantity representing a direction and a speed of a tidal current in the first layer;

a second layer tidal current data acquirer to acquire second layer tidal current data that represent an in-plane distribution in a second layer of a second layer vector quantity representing a direction and a speed of a tidal current in the second layer having a deeper water depth than the first layer;

an inter-layer tidal current difference calculator to calculate, by using the first layer tidal current data and the second layer tidal current data, inter-layer tidal current difference data that represent an in-plane distribution of a difference vector quantity being a difference between the first layer vector quantity and the second layer vector quantity, the in-plane distribution being parallel to the first layer and the second layer; and a display controller to perform inter-layer tidal current difference display control for displaying, over a map, an inter-layer tidal current difference distribution map that visualizes the in-plane distribution of the difference vector quantity represented by the inter-layer tidal current difference data.

A sea condition information providing method according to the present disclosure includes steps of:

(A) storing, in a storage device of a computer in advance before departure of a ship from port, first layer tidal current data that represent an in-plane distribution in a first layer of the sea of a first layer vector quantity representing a direction and a speed of a tidal current in the first layer, the first layer tidal current data including the in-plane distribution of the first layer vector quantity as a future predicted value;

(B) storing, in the storage device in advance before departure of the ship from port, second layer tidal current data that represent an in-plane distribution in a second layer of a second layer vector quantity representing a direction and a speed of a tidal current in the second layer having a deeper water depth than the first layer, the second layer tidal current data including the in-plane distribution of the second layer vector quantity as a future predicted value;

(C) by the computer in the ship after departure from port, calculating, by using the first layer tidal current data and the second layer tidal current data stored in the storage device, inter-layer tidal current difference data that represent an in-plane distribution of a difference vector quantity being a difference between the first layer vector quantity and the second layer vector quantity, the in-plane distribution being parallel to the first layer and the second layer, and displaying, over a map, an inter-layer tidal current difference distribution map that visualizes the calculated in-plane distribution of the difference vector quantity;

(D) by the computer, accepting designation of a local region on the map displayed in the step (C) from a crew; and (E) by the computer, calculating, by using the first layer tidal current data and the second layer tidal current data stored in the storage device, the inter-layer tidal current difference data for future n (note that n≥ is a natural number equal to or more than two) unit periods in the local region designated in the step (D), creating, by the unit period, a local tidal current difference image in which the inter-layer tidal current difference distribution map of the local region overlaps the map of the local region, by using the calculated inter-layer tidal current difference data for future n unit periods, and displaying the created local tidal current difference image for future n unit periods.

Advantageous Effects of Invention

According to the present disclosure, an inter-layer tidal current difference distribution map that visualizes an in-plane distribution of a difference vector quantity is displayed over a map. Thus, a region where tidal currents resemble each other between layers of a first layer and a second layer can be easily found.

BRIEF DESCRIPTION OF DRAWINGS

FIG. 5 is a schematic diagram illustrating a screen displayed on the display device by local tidal current difference image display control according to Embodiment 1;

DESCRIPTION OF EMBODIMENTS

Figure 1:
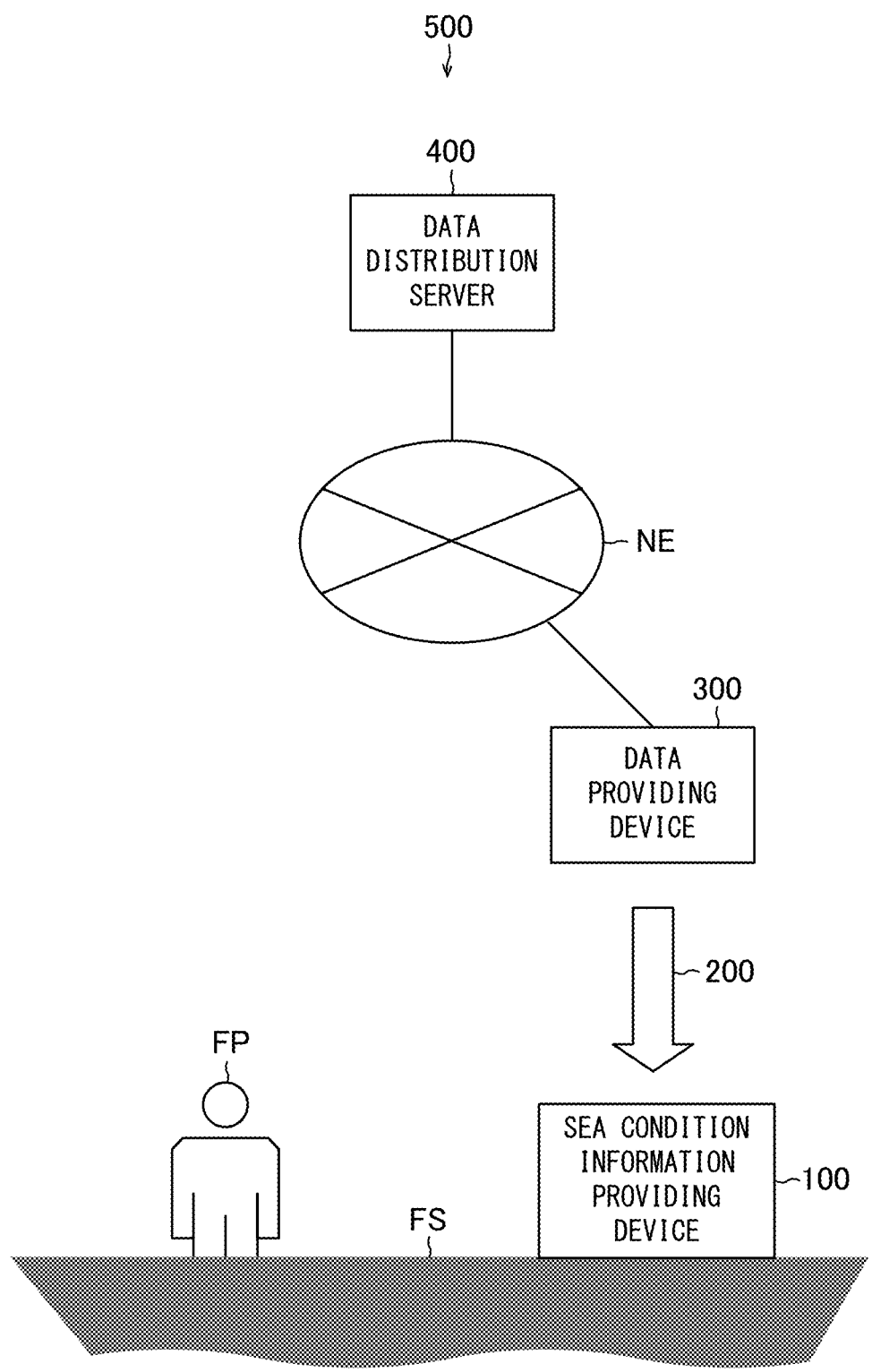
FIG. 1 is a schematic diagram illustrating a configuration of a sea condition information providing system according to Embodiment 1.

Hereinafter, a sea condition information providing system according to embodiments is described with reference to the drawings. In the drawings, the same or corresponding portion has the same reference sign.

Embodiment 1

As illustrated in FIG. 1, a sea condition information providing system 500 according to the present embodiment includes a data distribution server 400 that distributes sea condition data 200 being data about a sea condition, a data providing device 300 connected to the data distribution server 400 through a communication line NE, and a sea condition information providing device 100 installed in a ship FS.

The data providing device 300 acquires the sea condition data 200 from the data distribution server 400, and provides the acquired sea condition data 200 to the sea condition information providing device 100. The sea condition information providing device 100 uses the sea condition data 200 provided from the data providing device 300, and provides information about a sea condition (hereinafter described as sea condition information) to a crew FP being a user during navigation of the ship FS.

Note that, after departure of the ship FS from port, communication between the sea condition information providing device 100 in the ship and the data providing device 300 outside the ship may be difficult to establish. Then, the data providing device 300 provides latest sea condition data 200 including a predicted value to the sea condition information providing device 100 before departure of the ship FS from port. Thus, the sea condition information providing device 100 can provide sea condition information in an off-line state where communication with the data providing device 300 is disconnected during navigation of the ship FS.

In the present embodiment, a case where the ship FS is a fishing boat that catches fish with a round haul net is illustratively described. Sea condition information provided to the crew FP by the sea condition information providing device 100 is used for estimating a fishing ground. A configuration of the sea condition information providing device 100 is described below.

Figure 2:
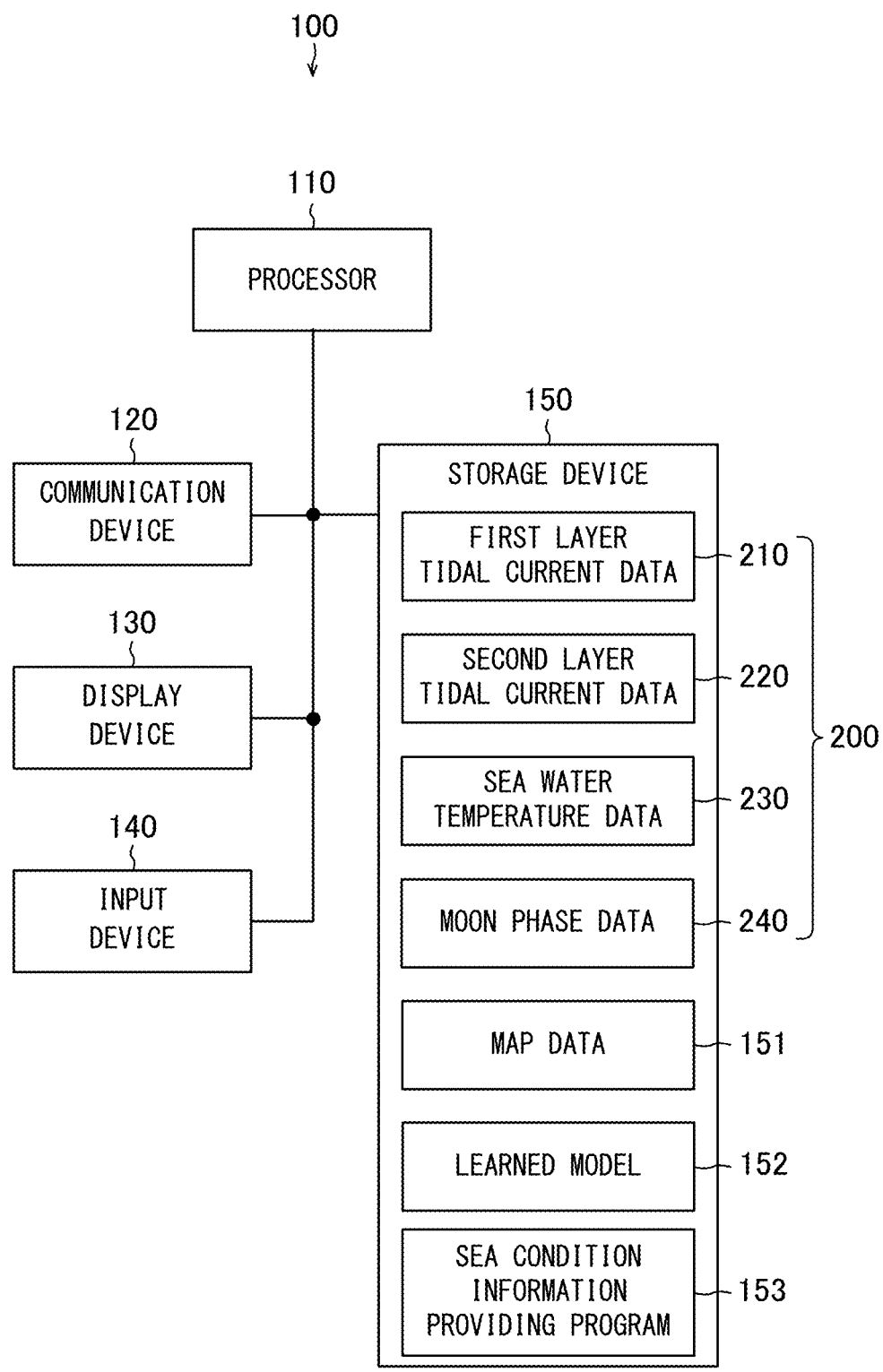
FIG. 2 is a schematic diagram illustrating a configuration of a sea condition information providing device according to Embodiment 1.

As illustrated in FIG. 2, the sea condition information providing device 100 includes a communication device 120 being hardware for receiving the sea condition data 200 from the data providing device 300 described above, and a storage device 150 for storing the received sea condition data 200. FIG. 2 illustrates a state where the sea condition data 200 are already stored in the storage device 150.

The sea condition data 200 include first layer tidal current data 210, second layer tidal current data 220, sea water temperature data 230, and moon phase data 240.

The first layer tidal current data 210 represent an in-plane distribution in a first layer of a first layer vector quantity representing a direction and a speed of a tidal current in the first layer of the sea. The first layer tidal current data 210 include not only an in-plane distribution of the first layer vector quantity when the ship FS departs from port, but also an in-plane distribution of the first layer vector quantity as a future predicted value, that is, a predicted value after departure from port.

The second layer tidal current data 220 represent an in-plane distribution in a second layer of a second layer vector quantity representing a direction and a speed of a tidal current in the second layer having a deeper water depth than the first layer. The second layer tidal current data 220 include not only an in-plane distribution of the second layer vector quantity when the ship FS departs from port, but also an in-plane distribution of the second layer vector quantity as a future predicted value, that is, a predicted value after departure from port.

Note that, in the present specification, the "first layer" and the "second layer" each indicate a horizontal layered virtual region having a thickness in the sea. In the present embodiment, a water depth of a center portion in a thickness direction of the first layer is equal to or more than 1 m and equal to or less than 5 m. A water depth of a center portion in a thickness direction of the second layer is equal to or more than 20 m and equal to or less than 40 m.

The sea water temperature data 230 represent an in-plane distribution of sea water temperature parallel to the first layer and the second layer. The sea water temperature data 230 include not only an in-plane distribution of sea water temperature at a time of departure from port, but also an in-plane distribution of sea water temperature as a future predicted value, that is, a predicted value after departure from port. In the present embodiment, the sea water temperature data 230 represent an in-plane distribution of sea water temperature in the first layer. Further, the moon phase data 240 represent a moon phase at a time of departure from port and in the future.

Further, the storage device 150 stores, in advance, map data 151 representing a map, a learned model 152 for estimating a catch quantity, and a sea condition information providing program 153 that defines procedures of processing of providing sea condition information.

Further, the sea condition information providing device 100 includes a display device 130 that displays, over a map, a condition of a tidal current, an in-plane distribution of sea water temperature, and the like, and an input device 140 for the crew FP to perform various input operations of designating a region as a candidate for a fishing ground on the map displayed on the display device 130. The display device 130 and the input device 140 constitute a graphical user interface.

Further, the sea condition information providing device 100 includes a processor 110 that executes the sea condition information providing program 153. Functions achieved by the processor 110 executing the sea condition information providing program 153 are described below.

Figure 3:
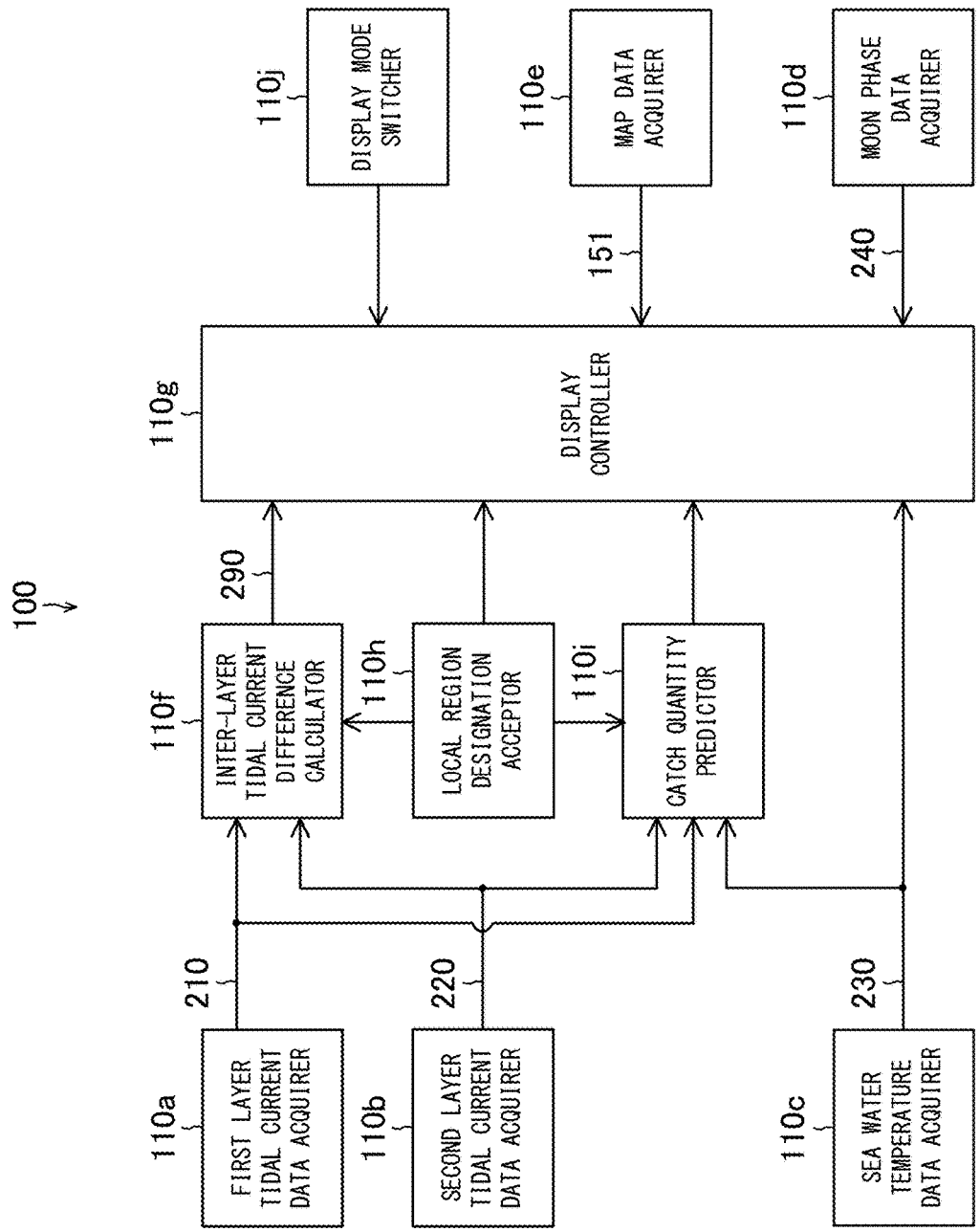
FIG. 3 is a schematic diagram illustrating functions of the sea condition information providing device according to Embodiment 1.

As illustrated in FIG. 3, the sea condition information providing device 100 includes a first layer tidal current data acquirer 110a that acquires the first layer tidal current data 210 from the storage device 150, a second layer tidal current data acquirer 110b that acquires the second layer tidal current data 220 from the storage device 150, a sea water temperature data acquirer 110c that acquires the sea water temperature data 230 from the storage device 150, a moon phase data acquirer 110d that acquires the moon phase data 240 from the storage device 150, and a map data acquirer 110e that acquires the map data 151 from the storage device 150.

Further, the sea condition information providing device 100 includes an inter-layer tidal current difference calculator 110f that calculates inter-layer tidal current difference data 290 by using the first layer tidal current data 210 and the second layer tidal current data 220. The inter-layer tidal current difference calculator 110f calculates a difference vector quantity being a difference between a first layer vector quantity represented by the first layer tidal current data 210 and a second layer vector quantity represented by the second layer tidal current data 220 at the same time. Data about the difference vector quantity representing an in-plane distribution parallel to the first layer and the second layer are the inter-layer tidal current difference data 290.

Further, the sea condition information providing device 100 includes a display controller 110g that visualizes the inter-layer tidal current difference data 290 calculated by the inter-layer tidal current difference calculator 110f, and displays the inter-layer tidal current difference data 290 on the display device 130. Specifically, the display controller 110g performs inter-layer tidal current difference display control for displaying, over a map represented by the map data 151, an inter-layer tidal current difference distribution map that visualizes the in-plane distribution of the difference vector quantity represented by the inter-layer tidal current difference data 290.

Figure 4:
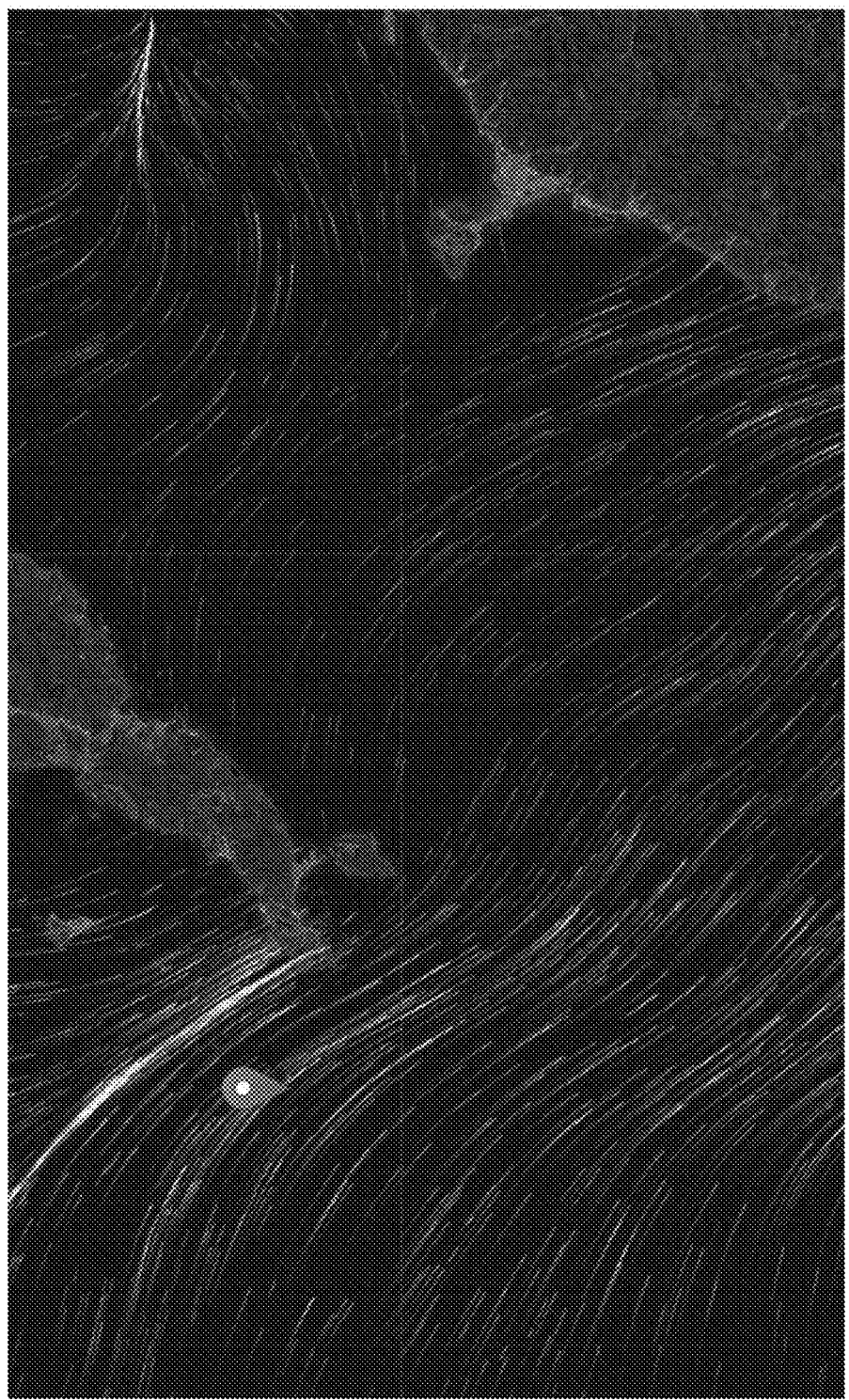
FIG. 4 is a schematic diagram illustrating a screen displayed on a display device by inter-layer tidal current difference display control according to Embodiment 1.

FIG. 4 illustrates a screen displayed on the display device 130 by the inter-layer tidal current difference display control. The inter-layer tidal current difference distribution map is an image that expresses, by a line segment, a difference vector quantity in each coordinate defined in a lattice shape in the sea. A direction of the line segment represents a direction of a difference between the first layer vector quantity and the second layer vector quantity. A length of the line segment represents magnitude of the difference vector quantity.

The inter-layer tidal current difference data 290 have a data structure that associates the difference vector quantity with each coordinate described above. Thus, by associating a coordinate represented by the inter-layer tidal current difference data 290 with a coordinate represented by the map data 151, the inter-layer tidal current difference distribution map can be displayed over the map represented by the map data 151. Note that a difference vector quantity in each coordinate may be set as an initial value, and a state of a time change in the initial value may be indicated by a simulation.

In the screen (hereinafter, described as a global inter-layer tidal current difference distribution display screen) illustrated in FIG. 4, the in-plane distribution of the difference vector quantity in a global region where the ship FS may move between departure from port and return to port is expressed in a visually recognizable manner. Thus, the crew FP can easily find a region having a relatively small difference vector quantity in the sea.

As described above, a fishing ground of fishing with a round haul net is preferably a region having a relatively small difference vector quantity. In other words, according to the global inter-layer tidal current difference distribution display screen illustrated in FIG. 4, a region (hereinafter, described as a local region) being a candidate for a fishing ground can be easily estimated without the ship FS actually going to the local region being the candidate for the fishing ground.

Returning to FIG. 3, and description continues. The sea condition information providing device 100 also includes a local region designation acceptor 110h that accepts designation of a local region estimated as described above from the crew FP. Specifically, the local region designation acceptor 110h accepts, from the crew FP, designation of a desired local region in the sea on the map displayed on the above-described global inter-layer tidal current difference distribution display screen by the display controller 110g.

In other words, the crew FP designates, by using the input device 140 illustrated in FIG. 2, a local region being a candidate for a fishing ground in the sea displayed on the map illustrated in FIG. 4. The local region designation acceptor 110h accepts the designation.

Further, the sea condition information providing device 100 also includes a catch quantity predictor 110i that predicts a catch quantity. The catch quantity predictor 110i predicts a catch quantity in a local region when designation of the local region is accepted by the local region designation acceptor 110h.

Specifically, by using the first layer tidal current data 210, the second layer tidal current data 220, and the sea water temperature data 230, the catch quantity predictor 110i predicts, for each unit period, a catch quantity in a local region on a current day on which the local region is designated, and a catch quantity in the local region in future n (note that n≥ is a natural number equal to or more than two) unit periods with reference to the current day.

Herein, the "unit period" means a predetermined period being a unit. In the present embodiment, the unit period is set to one day. Further, n is set to 5. In other words, the catch quantity predictor 110i predicts, by day, a catch quantity in the local region for a current day and future five days.

The catch quantity predictor 110i predicts a catch quantity by using the learned model 152 illustrated in FIG. 2. In other words, the learned model 152 illustrated in FIG. 2 is subjected to machine learning for estimating a catch quantity by using geographic data that determine a local region, the first layer tidal current data 210, the second layer tidal current data 220, and the sea water temperature data 230.

When designation of a local region is accepted by the local region designation acceptor 110h, the catch quantity predictor 110i inputs geographic data that determine the local region, the first layer tidal current data 210, the second layer tidal current data 220, and the sea water temperature data 230 to the learned model 152. The learned model 152 outputs, for a current day and future five days, a prediction result of a catch quantity for each day in the local region represented by the input geographic data.

Further, when designation of the local region is accepted by the local region designation acceptor 110h, the above-described inter-layer tidal current difference calculator 110f calculates, for each day, the inter-layer tidal current difference data 290 about the local region on the current day on which the local region is designated and the inter-layer tidal current difference data 290 about the local region for the future five days with reference to the current day by using the first layer tidal current data 210 and the second layer tidal current data 220.

Then, the display controller 110g performs local tidal current difference image display control for visualizing the inter-layer tidal current difference data 290 about the local region on the current day and the future five days being calculated by the inter-layer tidal current difference calculator 110f, and displaying the inter-layer tidal current difference data 290 on the display device 130.

FIG. 5 illustrates a screen displayed on the display device 130 by the local tidal current difference image display control. A map 660 of a designated local region is displayed on the screen of the display device 130.

Further, a local tidal current difference image 610 for today and future five days is displayed by day on the screen of the display device 130. The local tidal current difference image 610 is an image in which the above-described inter-layer tidal current difference distribution map of the local region overlaps the map of the local region. Note that "today" herein means a current day on which the local region is designated in the global inter-layer tidal current difference distribution display screen illustrated in FIG. 4.

In this way, in the local tidal current difference image display control, the display controller 110g creates, by day, the local tidal current difference image 610 by using the inter-layer tidal current difference data 290 about the local region for today and the future five days being calculated by the inter-layer tidal current difference calculator 110f, and displays the created local tidal current difference image 610 for today and the future five days.

Further, a local tidal current distribution image 620 for today and the future five days is also displayed by day on the screen of the display device 130. The local tidal current distribution image 620 is an image representing an in-plane distribution of a first layer vector quantity in the local region.

In this way, in the local tidal current difference image display control, the display controller 110g creates, by day, the local tidal current distribution image 620 by using the first layer tidal current data 210, and displays, by day, the created local tidal current distribution image 620 for today and the future five days together with the local tidal current difference image 610.

Further, a local sea water temperature distribution image 630 for today and the future five days is also displayed by day on the screen of the display device 130. The local sea water temperature distribution image 630 is an image representing an in-plane distribution of sea water temperature in the local region.

In this way, in the local tidal current difference image display control, the display controller 110g creates, by day, the local sea water temperature distribution image 630 by using the sea water temperature data 230, and displays, by day, the created local sea water temperature distribution image 630 for today and the future five days together with the local tidal current difference image 610 and the local tidal current distribution image 620.

Further, a catch index image 640 for today and the future five days is also displayed by day on the screen of the display device 130. The catch index image 640 is an image representing a catch quantity predicted by the catch quantity predictor 110i by the number of icons. A greater number of the icons means a greater predicted catch quantity.

In this way, in the local tidal current difference image display control, the display controller 110g creates, by day, the catch index image 640 by using a prediction result of the catch quantity predictor 110i, and displays, by day, the created catch index image 640 for today and the future five days together with the local tidal current difference image 610, the local tidal current distribution image 620, and the local sea water temperature distribution image 630.

Further, a moon phase display image 650 for today and the future five days is also displayed by day on the screen of the display device 130. The moon phase display image 650 is an image that visualizes a moon phase.

In this way, in the local tidal current difference image display control, the display controller 110g creates, by day, the moon phase display image 650 by using the moon phase data 240, and displays, by day, the created moon phase display image 650 for today and the future five days together with the local tidal current difference image 610, the local tidal current distribution image 620, the local sea water temperature distribution image 630, and the catch index image 640.

As described above, in the local tidal current difference image display control, the display controller 110g displays the local tidal current difference image 610, the local tidal current distribution image 620, the local sea water temperature distribution image 630, the catch index image 640, and the moon phase display image 650 in a form of a table 600.

Returning to FIG. 3, and description continues. As described above, the display controller 110g performs the inter-layer tidal current difference display control and the local tidal current difference image display control. A mode of displaying the global inter-layer tidal current difference distribution display screen illustrated in FIG. 4 on the display device 130 by the inter-layer tidal current difference display control is referred to as a global display mode below. Further, a mode of displaying the table 600 illustrated in FIG. 5 on the display device 130 by the local tidal current difference image display control is referred to as a table display mode.

The sea condition information providing device 100 includes a display mode switcher 110j that accepts an instruction to switch between the global display mode and the table display mode. The crew FP can instruct switching between the global display mode and the table display mode by using the input device 140.

Hereinafter, a use method of the sea condition information providing device 100 according to the present embodiment is described with reference to FIG. 6.

Figure 6:
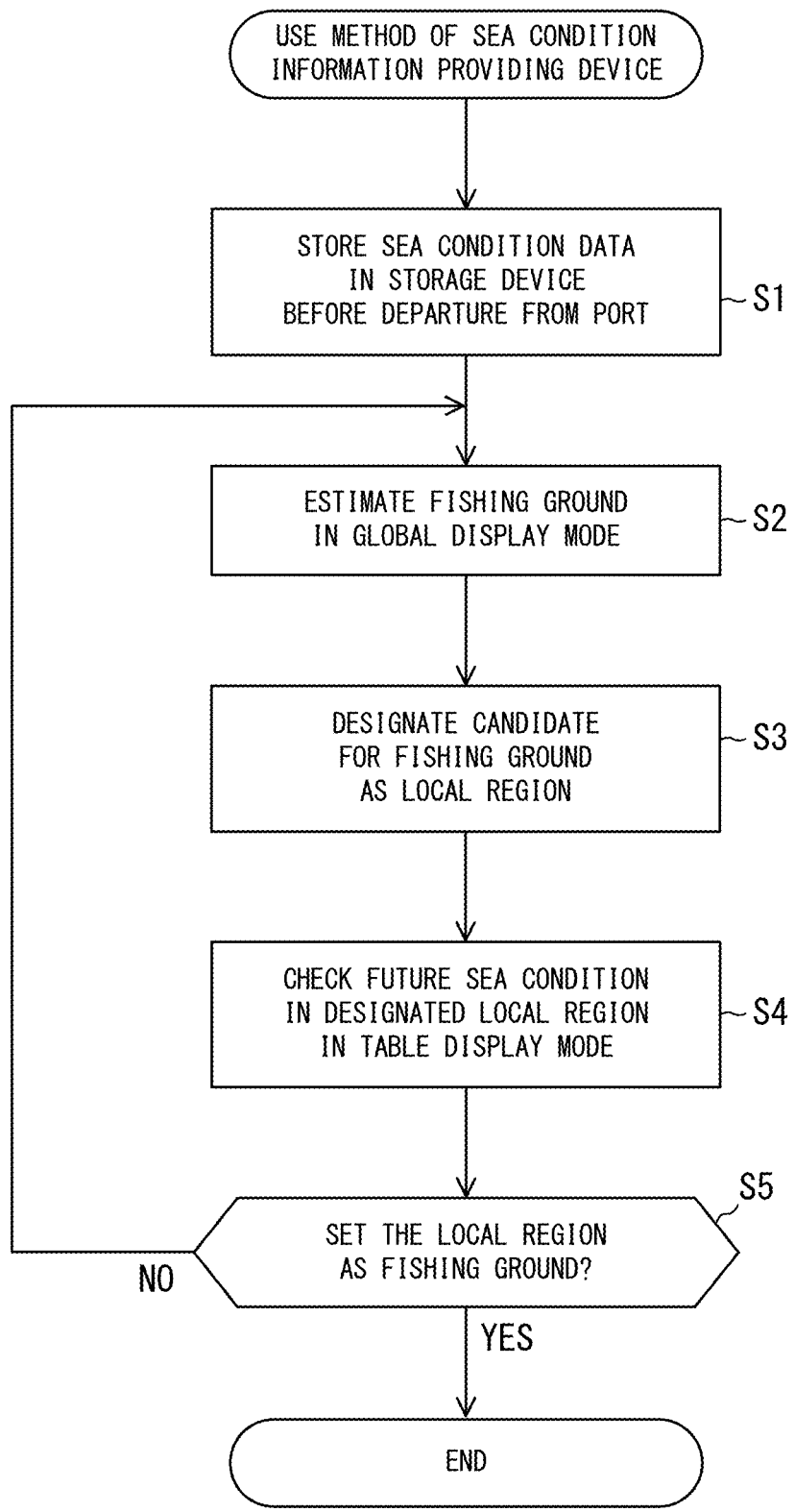
FIG. 6 is a flowchart illustrating a use method of the sea condition information providing device according to Embodiment 1.

As illustrated in FIG. 6, before departure of the ship FS from port, the data providing device 300 stores, in advance, the sea condition data 200 including a future predicted value of a physical quantity related to a sea condition in the storage device 150 of the sea condition information providing device 100 (step S1). Note that step S1 is one example of steps (A) and (B) according to the present disclosure.

After departure of the ship FS from port, the crew FS selects the global display mode by using the input device 140 in order to estimate a fishing ground (step S2). Then, the selection of the global display mode is accepted by the display mode switcher 110j.

In response to this, the inter-layer tidal current difference calculator 110f calculates the inter-layer tidal current difference data 290 about a global region where the ship FS may move between departure from port and return to port. Then, the display controller 110g displays the global inter-layer tidal current difference distribution display screen illustrated in FIG. 4 on the display device 130 by using the inter-layer tidal current data 290. Note that step S2 is one example of step (C) according to the present disclosure.

The crew FS views the global inter-layer tidal current difference distribution display screen being displayed on the display device 130, and designates a region having a relatively small difference vector quantity as a local region being a candidate for a fishing ground by using the input device 140 (step S3). Further, the crew FS selects the table display mode by using the input device 140.

Then, the designation of the local region is accepted by the local region designation acceptor 110h, and the selection of the table display mode is accepted by the display mode switcher 110j. Note that the acceptance of the designation of the local region is one example of step (D) according to the present disclosure.

Next, in response to the acceptance of the designation of the local region and the selection of the table display mode, the display controller 110g displays the table 600 illustrated in FIG. 5 on the display device 130. Note that the display of the table 600 is one example of step (E) according to the present disclosure.

The crew FS checks, by the table 600 displayed on the display device 130, a sea condition for a current day and future five days in the local region designated in step S3 (step S4). When the crew FS does not adopt the local region designated in step S3 as a fishing ground as a result of the check in step S4 (step S5; NO), the crew FS switches the display mode from the table display mode to the global display mode by using the input device 140 in order to find a different candidate for a fishing ground, and returns to step S2.

On the other hand, when the crew FS adopts the local region designated in step S3 as a fishing ground as a result of the check in step S4 (step S5; YES), the crew FS ends the present flow.

As described above, according to the present embodiment, the global inter-layer tidal current difference distribution display screen that visualizes an in-plane distribution of a difference vector quantity is displayed as illustrated in FIG. 4 in the global display mode achieved by the inter-layer tidal current difference display control. Thus, the crew FS can easily find a region where tidal currents resemble each other between layers of the first layer and the second layer by viewing the global inter-layer tidal current difference distribution display screen. In other words, a local region being a candidate for a fishing ground can be easily estimated without the ship FS actually going to the region being the candidate for the fishing ground.

Further, in the table display mode achieved by the local tidal current difference image display control, as illustrated in FIG. 5, the table 600 representing the sea condition for the current day and the future five days of the local region designated as the candidate for the fishing ground is displayed. Thus, the crew FS can easily determine whether to adopt the designated local region as the fishing ground by viewing the table 600.

Further, before departure of the ship FS from port, the first layer tidal current data 210 including an in-plane distribution of the first layer vector quantity as a future predicted value, the second layer tidal current data 220 including an in-plane distribution of the second layer vector quantity as a future predicted value, the sea water temperature data 230 including an in-plane distribution of sea water temperature as a future predicted value, and the like are stored in the storage device 150 of the sea condition information providing device 100. Thus, the sea condition information providing device 100 can provide sea condition information in an off-line state where communication with the data providing device 300 is disconnected during navigation of the ship FS.

Embodiment 2

A sea condition information providing device 100 may further have a function of displaying a condition of a tidal current in a deep layer close to a sea bottom. A specific example thereof is described below.

Figure 7:
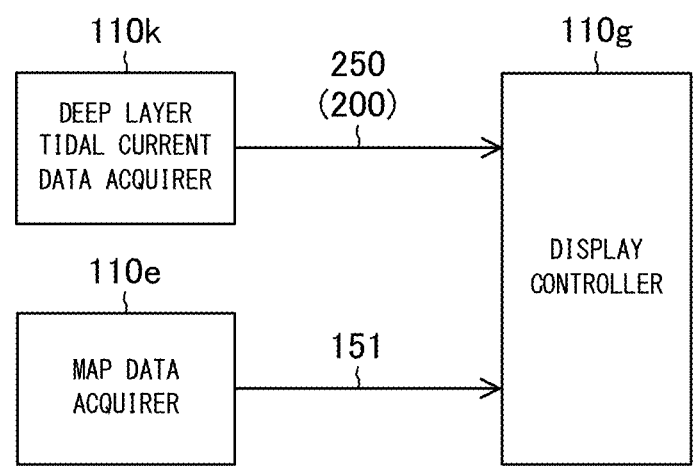
FIG. 7 is a schematic diagram illustrating a part of functions of a sea condition information providing device according to Embodiment 2.

As illustrated in FIG. 7, the sea condition information providing device 100 according to the present embodiment further includes a deep layer tidal current data acquirer 110k that acquires deep layer tidal current data 250. The deep layer tidal current data acquirer 110k acquires the deep layer tidal current data 250 from a storage device 150. In other words, in the present embodiment, the above-described sea condition data 200 stored in the storage device 150 of the sea condition information providing device 100 before departure from port include the deep layer tidal current data 250.

The deep layer tidal current data 250 represent an in-plane distribution in a deep layer of a deep layer vector quantity representing a direction and a speed of a tidal current in the deep layer closer to a sea bottom than a second layer. The deep layer tidal current data 250 include not only an in-plane distribution of the deep layer vector quantity at a time of departure from port, but also an in-plane distribution of the deep layer vector quantity as a future predicted value, that is, a predicted value after departure from port.

In the present embodiment, a display controller 110g further performs deep layer tidal current display control for visualizing and displaying the deep layer tidal current data 250. Specifically, in the deep layer tidal current display control, the display controller 110g displays, over a map representing relief of a sea bottom, a deep layer tidal current distribution map that visualizes the in-plane distribution of the deep layer vector quantity represented by the deep layer tidal current data 250.

Figure 8:
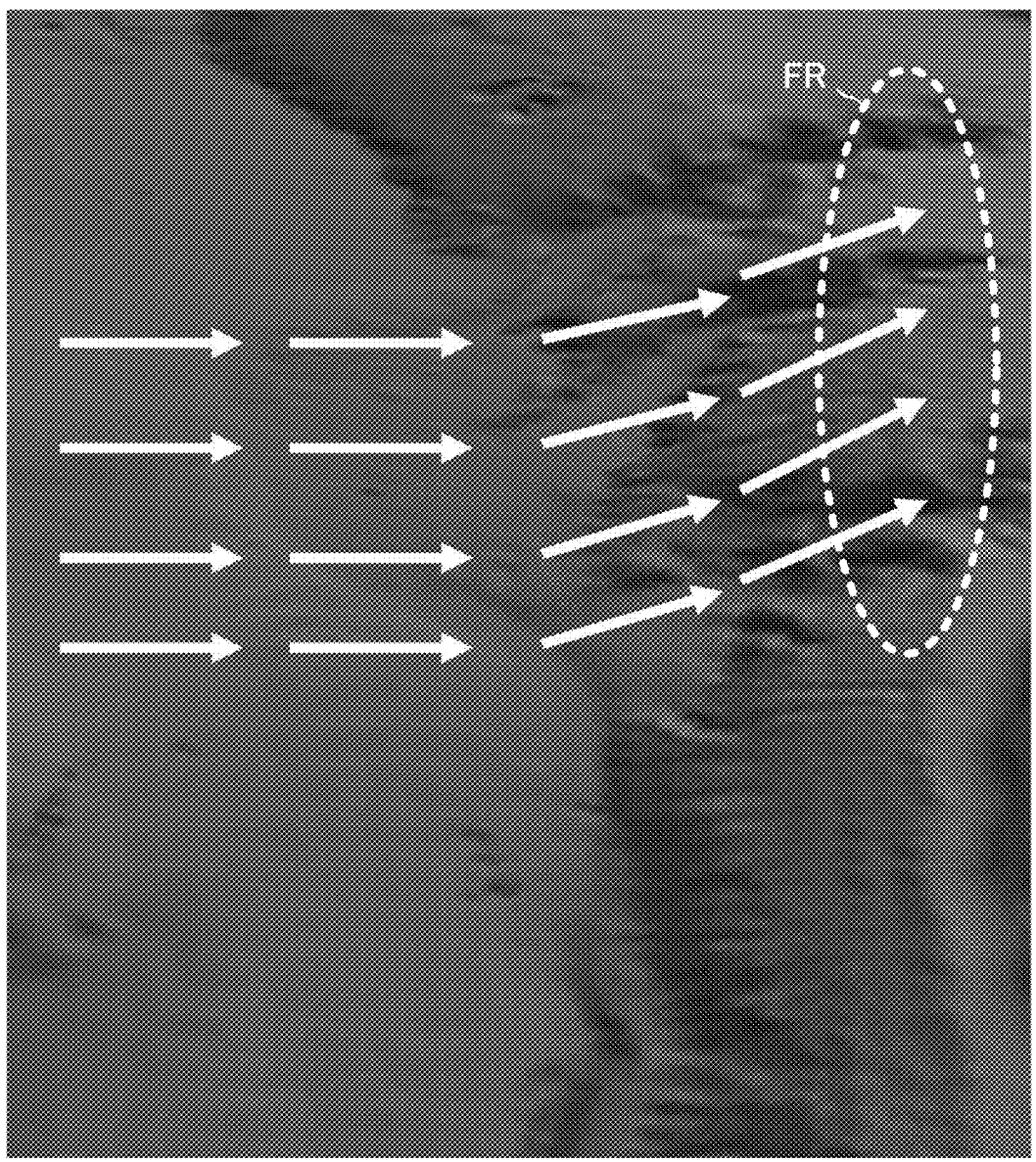
FIG. 8 is a schematic diagram illustrating a screen displayed on a display device by deep layer tidal current difference display control according to Embodiment 2.

FIG. 8 schematically illustrates a screen displayed on a display device 130 by the deep layer tidal current display control. The deep layer tidal current distribution map is an image that expresses, by an arrow or a line segment, a deep layer vector quantity in each coordinate in the sea. A direction of the arrow or the line segment represents a direction of a tidal current. A length of the arrow or the line segment represents a speed of a tidal current. As illustrated in FIG. 8, an in-plane distribution of a deep layer vector quantity is displayed over a map representing relief of a sea bottom.

The deep layer tidal current data 250 have a data structure that associates the deep layer vector quantity with each coordinate described above. Thus, by associating a coordinate represented by the deep layer tidal current data 250 with a coordinate represented by map data 151, the deep layer tidal current distribution map can be displayed over a map represented by the map data 151. Note that a deep layer vector quantity in each coordinate may be set as an initial value, and a state of a time change in the initial value may be indicated by a simulation.

As described above, according to the present embodiment, a crew FP can check a distribution of a tidal current in a deep layer. Similarly to the global inter-layer tidal current difference distribution display screen illustrated in FIG. 4, a condition of a tidal current in a deep layer may also become a determination element of selection of a fishing ground. According to the present embodiment, the crew FP can more appropriately estimate a fishing ground by considering not only the global inter-layer tidal current difference distribution display screen illustrated in FIG. 4, but also a global distribution of a tidal current in a deep layer.

Note that the crew FP can also check a condition of a tidal current in a deep layer of a local region designated as a candidate for a fishing ground. An image representing a condition of a tidal current in a deep layer of a local region may be presented by being included in the table 600 illustrated in FIG. 5.

Further, as described above, the relief of the sea bottom is represented in the map on which the deep layer tidal current distribution map is displayed. Thus, the crew FP can easily find, from the image illustrated in FIG. 8, a place where a tidal current hits an elevated portion from the sea bottom.

For example, according to the image illustrated in FIG. 8, it is quite obvious that a tidal current in a deep layer hits an elevated portion from the sea bottom in a region FR. An ascending current is generated in such a region FR, and thus the region FR is often a suitable fishing ground. In this way, the region FR being a candidate for a fishing ground can be easily found.

Embodiment 3

In Embodiment 1, as illustrated in FIG. 4, a difference vector quantity between layers of a first layer and a second layer is visualized and displayed in a global display mode. Furthermore, a tidal current in a third layer may also be taken into consideration. A specific example thereof is described below.

Figure 9:
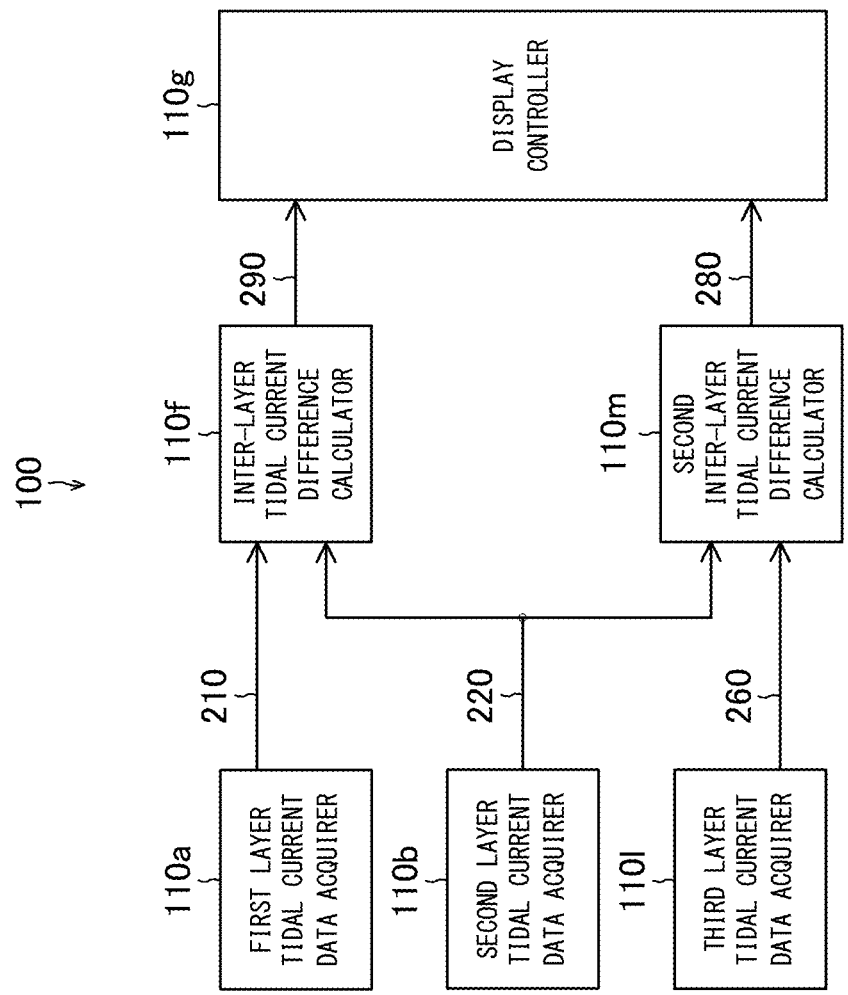
FIG. 9 is a schematic diagram illustrating a part of functions of a sea condition information providing device according to Embodiment 3.

As illustrated in FIG. 9, a sea condition information providing device 100 according to the present embodiment further includes a third layer tidal current data acquirer 110l that acquires third layer tidal current data 260. The third layer tidal current data acquirer 110l acquires the third layer tidal current data 260 from a storage device 150. In other words, in the present embodiment, the above-described sea condition data 200 stored in the storage device 150 of the sea condition information providing device 100 before departure from port include the third layer tidal current data 260.

The third layer tidal current data 260 represent an in-plane distribution in a third layer of a third layer vector quantity representing a direction and a speed of a tidal current in the third layer having a deeper water depth than a second layer. The third layer tidal current data 260 include not only an in-plane distribution of the third layer vector quantity at a time of departure from port, but also an in-plane distribution of the third layer vector quantity as a future predicted value.

Further, the sea condition information providing device 100 according to the present embodiment includes a second inter-layer tidal current difference calculator 110m that calculates second inter-layer tidal current difference data 280 by using second layer tidal current data 220 and the third layer tidal current data 260. The second inter-layer tidal current difference calculator 110m calculates a difference vector quantity being a difference between a second layer vector quantity represented by the second layer tidal current data 220 and the third layer vector quantity represented by the third layer tidal current data 260 at the same time. Data about the difference vector quantity representing an in-plane distribution parallel to the second layer and the third layer are the second inter-layer tidal current difference data 280.

A display controller 110g according to the present embodiment has not only a function of visualizing inter-layer tidal current difference data 290 as illustrated in FIG. 4 and displaying the inter-layer tidal current difference data 290 on a display device 130, but also a function of visualizing the second inter-layer tidal current difference data 280 calculated by the second inter-layer tidal current difference calculator 110m and displaying the second inter-layer tidal current difference data 280 on the display device 130.

A state of visualizing the inter-layer tidal current difference data 290 and displaying the inter-layer tidal current difference data 290 on the display device 130 and a state of visualizing the second inter-layer tidal current difference data 280 and displaying the second inter-layer tidal current difference data 280 on the display device 130 may be switched by an operation of a crew FP, or the inter-layer tidal current difference data 290 and the second inter-layer tidal current difference data 280 may be visualized and displayed together.

Embodiments 1 to 3 are described above. Modification described below is also possible.

FIG. 6 illustrates the technique for storing, in advance, all the sea condition data 200 in the storage device 150 of the sea condition information providing device 100 before departure of the ship FS from port. In other words, in Embodiment 1, each of the first layer tidal current data acquirer 110a, the second layer tidal current data acquirer 110b, the sea water temperature data acquirer 110c, and the moon phase data acquirer 110d acquires the sea condition data 200 from the storage device 150. According to the technique, the sea condition information providing device 100 can be used in an off-line state where communication with the data providing device 300 is disconnected after departure of the ship FS from port.

However, a part or the whole of the sea condition data 200 may be transmitted from the data providing device 300 to the sea condition information providing device 100 at a point in time at which communication between the data providing device 300 and the sea condition information providing device 100 is established after departure of the ship FS from port. In other words, at least any of the first layer tidal current data acquirer 110a, the second layer tidal current data acquirer 110b, the sea water temperature data acquirer 110c, and the moon phase data acquirer 110d may acquire the sea condition data 200 from the data providing device 300.

FIG. 5 illustrates the case where the "unit period" is one day, but the "unit period" may be a few hours less than one day, for example, 6 hours, or may be a period of two days or more. Further, FIG. 5 illustrates the configuration for presenting a predicted condition of a sea condition for future five unit periods, but a predicted condition of a sea condition for less than five unit periods, for example, three unit periods may be presented, or a predicted condition of a sea condition for equal to or more than five unit periods, for example, seven unit periods may be presented.

By installing the sea condition information providing program 153 illustrated in FIG. 2 onto existing smartphone, tablet, and other computer, the function of the sea condition information providing device 100 can also be achieved by the computer. The sea condition information providing program 153 may be distributed via a communication network, or may be stored in a computer-readable non-transitory recording medium and be distributed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2022-106410, filed on Jun. 30, 2022, the entire disclosure of which is incorporated by reference herein.

REFERENCE SIGNS LIST

100 Sea condition information providing device
110 Processor
110a First layer tidal current data acquirer
110b Second layer tidal current data acquirer
110c Sea water temperature data acquirer
110d Moon phase data acquirer
110e Map data acquirer
110f Inter-layer tidal current difference calculator
110g Display controller
110h Local region designation acceptor
110i Catch quantity predictor
110j Display mode switcher
110k Deep layer tidal current data acquirer
110l Third layer tidal current data acquirer
110m Second inter-layer tidal current difference calculator
120 Communication device
130 Display device
140 Input device
150 Storage device
151 Map data
152 Learned model
153 Sea condition information providing program
200 Sea condition data
210 First layer tidal current data
220 Second layer tidal current data
230 Sea water temperature data
240 Moon phase data
250 Deep layer tidal current data
260 Third layer tidal current data
280 Second inter-layer tidal current difference data
290 Inter-layer tidal current difference data
300 Data providing device
400 Data distribution server
500 Sea condition information providing system
600 Table
610 Local tidal current difference image
620 Local tidal current distribution image
630 Local sea water temperature distribution image
640 Catch index image
650 Moon phase display image
660 Map of local region
NE Communication line
FP Crew (user)
FR Region
FS Ship

The invention claimed is:

1. A sea condition information providing device comprising:

a first layer tidal current data acquirer to acquire first layer tidal current data that represent an in-plane distribution in a first layer of the sea of a first layer vector quantity representing a direction and a speed of a tidal current in the first layer and that include the in-plane distribution of the first layer vector quantity as a future predicted value;

a second layer tidal current data acquirer to acquire second layer tidal current data that represent an in-plane distribution in a second layer of a second layer vector quantity representing a direction and a speed of a tidal current in the second layer having a deeper water depth than the first layer and that include the in-plane distribution of the second layer vector quantity as a future predicted value;

an inter-layer tidal current difference calculator to calculate, by using the first layer tidal current data and the second layer tidal current data, inter-layer tidal current difference data that represent an in-plane distribution of a difference vector quantity being a difference between the first layer vector quantity and the second layer vector quantity, the in-plane distribution being parallel to the first layer and the second layer;

a display controller to perform inter-layer tidal current difference display control for displaying, over a map, an inter-layer tidal current difference distribution map that visualizes the in-plane distribution of the difference vector quantity represented by the inter-layer tidal current difference data; and a local region designation acceptor to accept, from a user, designation of a local region in the sea on the map displayed by the display controller, wherein, when designation of the local region is accepted by the local region designation acceptor, (i) the inter-layer tidal current difference calculator calculates, by using the first layer tidal current data and the second layer tidal current data, the inter-layer tidal current difference data about the local region for future n (note that n is a natural number equal to or more than two) unit periods, and (ii) the display controller performs local tidal current difference image display control for creating, by the unit period, a local tidal current difference image in which the inter-layer tidal current difference distribution map of the local region overlaps the map of the local region, by using the inter-layer tidal current difference data about the local region for future n unit periods, and displaying the created local tidal current difference image for future n unit periods.

2. The sea condition information providing device according to claim 1, further comprising a catch quantity predictor to predict, for each of the unit periods, a catch quantity in the local region for future n unit periods by using at least the first layer tidal current data and the second layer tidal current data, wherein the display controller displays, by the unit period, a prediction result of the catch quantity predictor together with the local tidal current difference image for future n unit periods in the local tidal current difference image display control.

3. The sea condition information providing device according to claim 1, further comprising a sea water temperature data acquirer to acquire sea water temperature data that represent an in-plane distribution of sea water temperature parallel to the first layer and the second layer, the sea water temperature data including the in-plane distribution of the sea water temperature as a future predicted value, wherein, in the local tidal current difference image display control, the display controller creates, for future n unit periods by the unit period, a local sea water temperature distribution image representing the in-plane distribution of the sea water temperature in the local region, and displays, for future n unit periods by the unit period, the created local sea water temperature distribution image together with the local tidal current difference image.

4. The sea condition information providing device according to claim 1, wherein, in the local tidal current difference image display control, the display controller creates, for future n unit periods by the unit period, a local tidal current distribution image representing the in-plane distribution of the first layer vector quantity in the local region, and displays, for future n unit periods by the unit period, the created local tidal current distribution image together with the local tidal current difference image.

5. The sea condition information providing device according to claim 1, further comprising a deep layer tidal current data acquirer to acquire deep layer tidal current data that represent an in-plane distribution in a deep layer of a deep layer vector quantity representing a direction and a speed of a tidal current in the deep layer closer to a sea bottom than the second layer,
wherein the display controller further performs deep layer tidal current display control for displaying, over the map expressing relief of the sea bottom, a deep layer tidal current distribution map that visualizes the in-plane distribution of the deep layer vector quantity represented by the deep layer tidal current data.

6. A sea condition information providing system comprising:
the sea condition information providing device according to claim 1; and
a data providing device to provide the first layer tidal current data to the first layer tidal current data acquirer of the sea condition information providing device, and also provide the second layer tidal current data to the second layer tidal current data acquirer of the sea condition information providing device.

7. A non-transitory computer-readable recording medium storing a sea condition information providing program, the sea condition information providing program causing a computer to function as:
a first layer tidal current data acquirer to acquire first layer tidal current data that represent an in-plane distribution in a first layer of the sea of a first layer vector quantity representing a direction and a speed of a tidal current in the first layer and that include the in-plane distribution of the first layer vector quantity as a future predicted value;
a second layer tidal current data acquirer to acquire second layer tidal current data that represent an in-plane distribution in a second layer of a second layer vector quantity representing a direction and a speed of a tidal current in the second layer having a deeper water depth than the first layer and that include the in-plane distribution of the second layer vector quantity as a future predicted value;
an inter-layer tidal current difference calculator to calculate, by using the first layer tidal current data and the second layer tidal current data, inter-layer tidal current difference data that represent an in-plane distribution of a difference vector quantity being a difference between the first layer vector quantity and the second layer vector quantity, the in-plane distribution being parallel to the first layer and the second layer;
a display controller to perform inter-layer tidal current difference display control for displaying, over a map, an inter-layer tidal current difference distribution map that visualizes the in-plane distribution of the difference vector quantity represented by the inter-layer tidal current difference data; and
a local region designation acceptor to accept, from a user, designation of a local region in the sea on the map displayed by the display controller, wherein,
when designation of the local region is accepted by the local region designation acceptor,
(i) the inter-layer tidal current difference calculator calculates, by using the first layer tidal current data and the second layer tidal current data, the inter-layer tidal current difference data about the local region for future n (note that n is a natural number equal to or more than two) unit periods, and
(ii) the display controller performs local tidal current difference image display control for creating, by the unit period, a local tidal current difference image in which the inter-layer tidal current difference distribution map of the local region overlaps the map of the local region, by using the inter-layer tidal current difference data about the local region for future n unit periods, and displaying the created local tidal current difference image for future n unit periods.

8. A sea condition information providing method comprising steps of:
(A) storing, in a storage device of a computer in advance before departure of a ship from port, first layer tidal current data that represent an in-plane distribution in a first layer of the sea of a first layer vector quantity representing a direction and a speed of a tidal current in the first layer, the first layer tidal current data including the in-plane distribution of the first layer vector quantity as a future predicted value;
(B) storing, in the storage device in advance before departure of the ship from port, second layer tidal current data that represent an in-plane distribution in a second layer of a second layer vector quantity representing a direction and a speed of a tidal current in the second layer having a deeper water depth than the first layer, the second layer tidal current data including the in-plane distribution of the second layer vector quantity as a future predicted value;
(C) by the computer in the ship after departure from port, calculating, by using the first layer tidal current data and the second layer tidal current data stored in the storage device, inter-layer tidal current difference data that represent an in-plane distribution of a difference vector quantity being a difference between the first layer vector quantity and the second layer vector quantity, the in-plane distribution being parallel to the first layer and the second layer, and displaying, over a map, an inter-layer tidal current difference distribution map that visualizes the calculated in-plane distribution of the difference vector quantity;
(D) by the computer, accepting designation of a local region on the map displayed in the step (C) from a crew; and
(E) by the computer, calculating, by using the first layer tidal current data and the second layer tidal current data stored in the storage device, the inter-layer tidal current difference data for future n (note that n is a natural number equal to or more than two) unit periods in the local region designated in the step (D), creating, by the unit period, a local tidal current difference image in which the inter-layer tidal current difference distribution map of the local region overlaps the map of the local region, by using the calculated inter-layer tidal current difference data for future n unit periods, and displaying the created local tidal current difference image for future n unit periods.

* * * * *